Dec. 8, 1942.　　　F. B. DIESBACH　　　2,304,343
CLAMPING DEVICE
Filed April 18, 1940
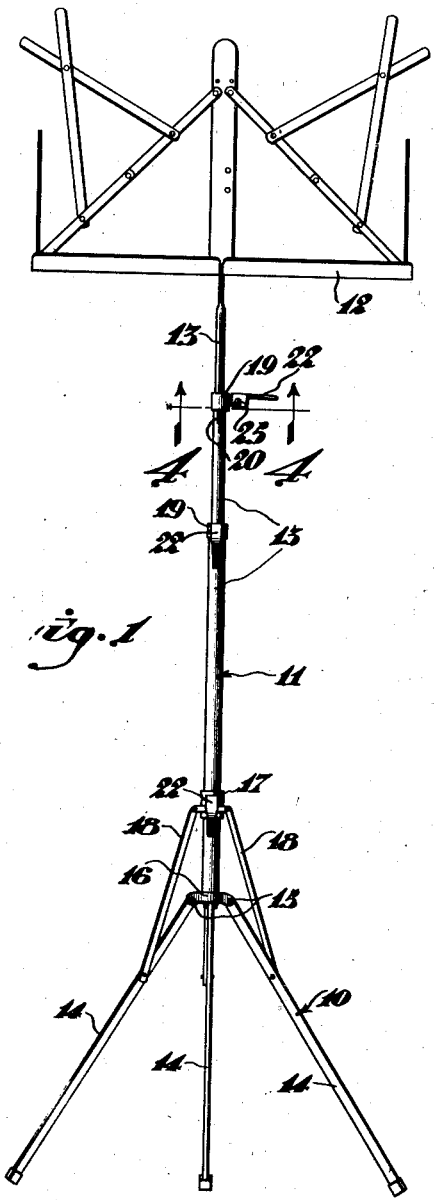
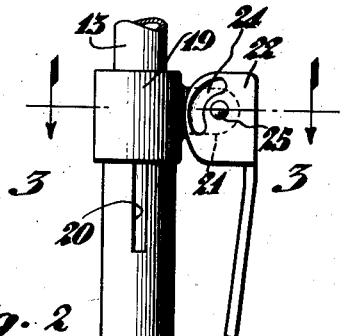
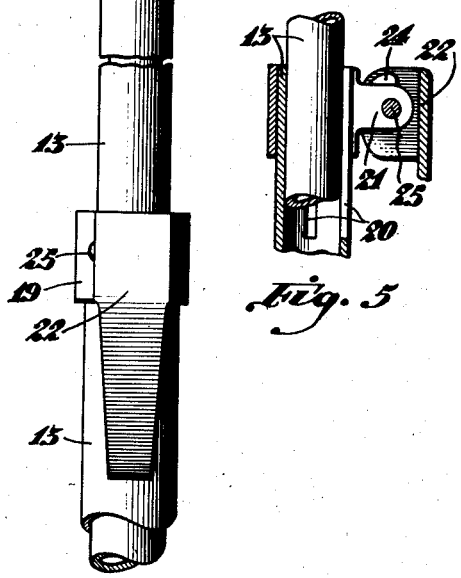
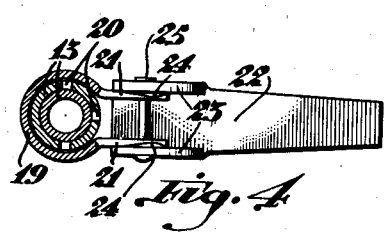
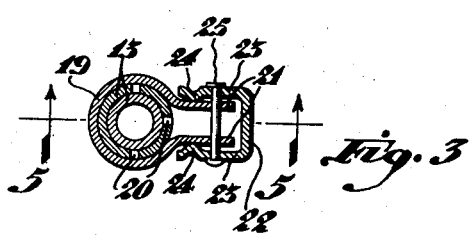
INVENTOR.
Frederick B. Diesbach
BY Work & Wood
ATTORNEYS Patented Dec. 8, 1942

2,304,343

UNITED STATES PATENT OFFICE 2,304,343

CLAMPING DEVICE

Frederick B. Diesbach, Hamilton, Ohio, assignor to Paul Benninghofen and Fritz G. Diesbach, Hamilton, Ohio, as trustees Application April 18, 1940, Serial No. 330,364

1 Claim. (Cl. 24—258)

This invention relates to clamping means. More particularly, the invention relates to clamping devices for fixing telescoping tubes, for example, those of the posts of music stands or the like, in selected positions of extension or for securing the legs of a tripod in fixed position.

It has been an object of the present inventor to provide a means for clamping tubular parts together, which means includes a split ring operated by a clamping finger which finger may be formed in an extremely simple manner by stamping and, which finger is highly effective for drawing the ring upon the parts to be secured together and is self-locking including for this purpose an extremely effective cam construction.

Other objects and certain advantages will be more fully apparent from a description of the drawing in which:

Figure 1 is a side view of a music stand incorporating clamps of the present invention for fixing the tripod in position and for holding the post extension sections in place.

Figure 2 is an enlarged fragmentary view of a portion of the post, showing several clamps, and showing the finger of one clamp in side view and the finger of another in face view.

Figure 3 is a sectional view taken on line 3—3 of Figure 2 detailing a clamp.

Figure 4 is a sectional view taken on line 4—4, Figure 1, looking at the underside of a released clamping finger.

Figure 5 is a sectional view taken on line 5—5, Figure 3, further illustrating the clamp.

As illustrated in the drawing, the clamp may be used either for holding post sections in position or for holding a tripod in fixed position. The music stand illustrated includes a tripod 10, a telescoping post 11 and a rack 12. The various sections of the post are indicated at 13. The legs 14 of the tripod are pivoted as at 15, to a base 16 at the lower end of the lower section. A slidable sleeve 17 is disposed on the lower section. Links 18 pivotally connect the sleeve 17 to intermediate points of the legs 10.

Each section of the post includes a split collar 19 fixed around its upper end and including a pair of spaced ears 21—21. The upper end of each section is longitudinally split as at 20 (Figure 3) so that the extension is compressible under the split collar. The sleeve 17 is of split collar form including as in the case of the split collars 19 a pair of spaced ears 21—21. These ears are bent outwardly from the body of the ring or the sleeve and the rings or sleeves are compressed or released by means of clamping fingers 22.

The upper portion of each clamping finger is U-shaped as shown particularly in Figure 3 and constitutes a pair of side flanges 23—23 between which the ears 21 are disposed. The side flanges 23, in each instance, include an inclined cam 24 formed by pressing an arcuate rib inwardly of each flange. The arcuate cam or rib is formed on a radius the center of which substantially coincides with the pivot pin 25 pivotally mounting the clamping finger.

Each cam or rib increases in height as it progresses arcuately. The rib may be described as inclined from the lower to the upper end so as to provide a camming action as the finger is moved downwardly. This camming action is imparted to the ears 21—21 directly through the ribs and the ears are pressed together to clamp the collar upon the sections. Therefore when the clamping finger is pressed down from the raised or unclamped position an effective clamping pressure is exerted with very little effort on the part of the operator. Obviously, the fingers may be stamped or pressed out to provide the flanges and the arcuate cam ribs in the flanges.

Having described my invention, I claim:

A clamping finger adapted to clamp together the generally radially extended spaced ears of a clamping ring, said clamping finger having flanges straddling said ears, a pivot pin extending through said ears and said flanges of said clamping finger for pivotally mounting said finger on said ears, said pivot pin being loosely mounted in position and including shoulders at its respective ends preventing axial displacement thereof, said flanges including arcuate indentations formed around the pivot means toward the body of the clamping ring and sloping circumferentially to constitute cam surfaces for drawing the flanges together when the finger is swung on the pivot.

FREDERICK B. DIESBACH.